April 17, 1956  G. C. SUMMERS ET AL  2,742,629
METALLIC COUPLING MEANS FOR ACOUSTIC LOGGING
Filed Jan. 11, 1952  2 Sheets-Sheet 1
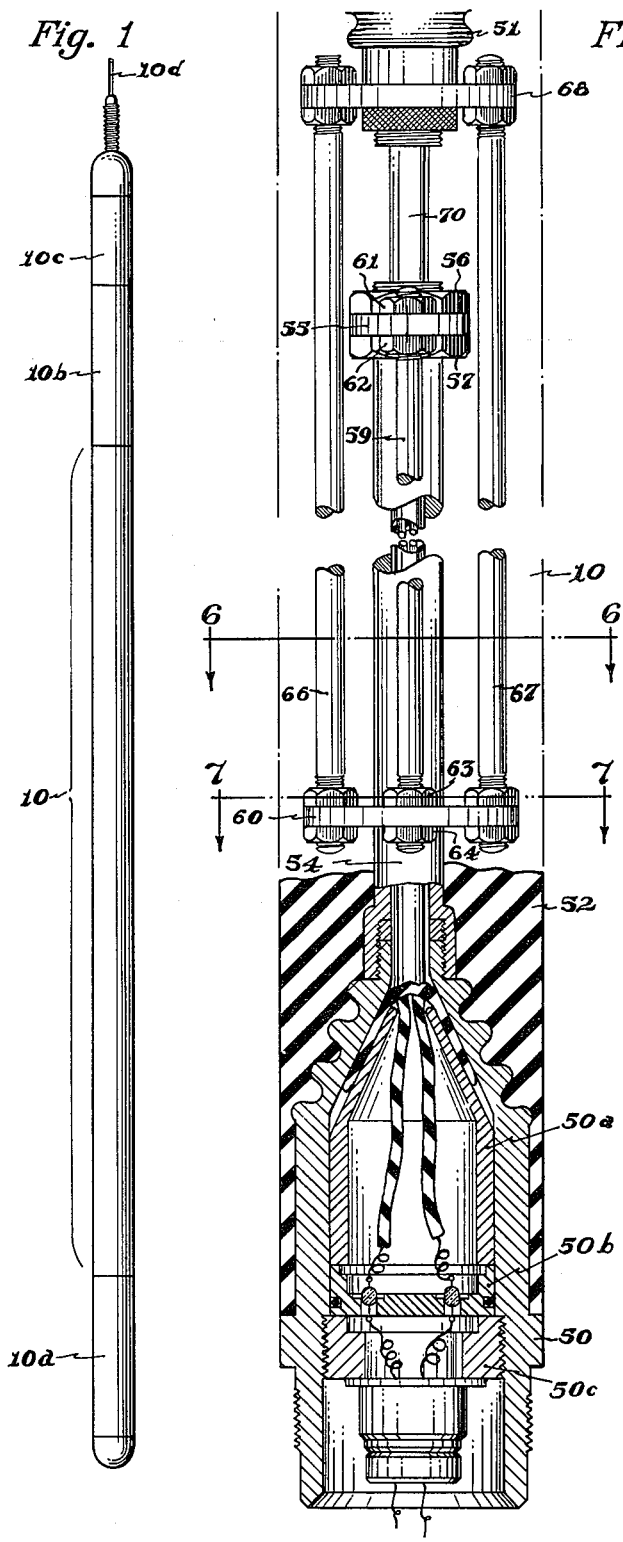
GERALD C. SUMMERS
ROBERT A. BRODING
INVENTORS
BY D. Carl Richards
AGENT April 17, 1956 G. C. SUMMERS ET AL 2,742,629
METALLIC COUPLING MEANS FOR ACOUSTIC LOGGING
Filed Jan. 11, 1952 2 Sheets-Sheet 2
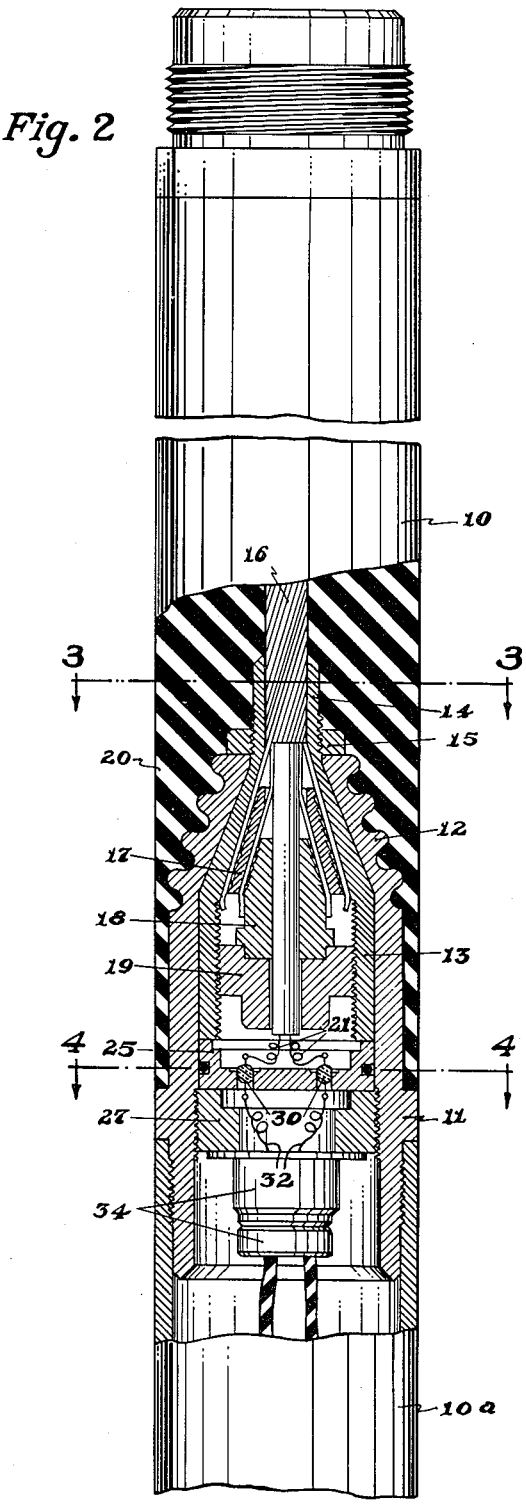
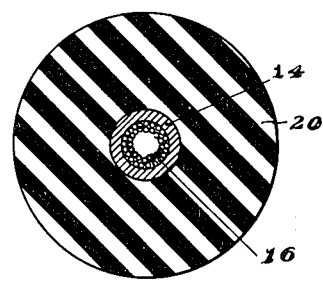
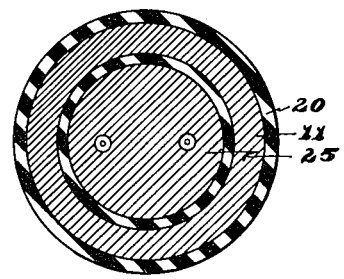
GERALD C. SUMMERS
ROBERT A. BRODING
INVENTORS
BY D. Carl Richards
AGENT

# United States Patent Office 2,742,629
Patented Apr. 17, 1956

2,742,629

METALLIC COUPLING MEANS FOR ACOUSTIC LOGGING

Gerald C. Summers and Robert A. Broding, Dallas, Tex., assignors, by mesne assignments, to Socony Mobil Oil Company, Inc., a corporation of New York Application January 11, 1952, Serial No. 266,032

11 Claims. (Cl. 340—18)

This invention relates to acoustic well logging and more particularly to a coupling member for maintaining acoustic transducers adapted for measurement of acoustic properties of formations adjacent a well bore in a predetermined spaced apart relation without unwanted sound transmission through the coupling member.

It has been proposed to lower an acoustic transmitter and an acoustic receiver through a bore hole to produce a curve or chart of energy traveling from the transmitter by way of the formations to the receiver in order to delineate the formations penetrated by the bore hole. In systems of the type in which the magnitude of the energy transmitted between two transducers is measured, it is desirable to utilize some means for assuring that the energy travels principally through the earth formations and not through media in the bore hole. A column of liquid in the bore hole is generally necessary in order to provide a coupling medium between the transducers and the formations. At the same time it is desirable to direct or focus the acoustic energy into the formations to prevent vertical travel through the liquid column. Further, the transmitter and receiver preferably are maintained a predetermined distance apart regardless of the hydrostatic pressure under which they operate.

In other systems such as those in which the travel time of an acoustic pulse in a predetermined earth section is measured, it is necessary that the coupling means between the transmitter and receiver be of such nature as to prevent an arrival of energy through the coupling means prior to the arrival of energy by way of the formations. At the same time the coupling means must be of such a nature as to maintain the transducers a predetermined distance apart.

In accordance with the present invention there is provided an improved coupling for an acoustic well logging system in which a pair of transducers adapted to measure the acoustic properties of media adjacent thereto is to be lowered into the bore hole. Rigid end members are adapted to be coupled to the transducers. A tension-compression bearing member is secured at each end to the end members and is disposed in a serpentine path between the end members. A channel extending through the tension-compression bearing member extends into the end members and provides a passage for electric conducting means between the transducers. In one aspect of the invention, a resilient sheath is moulded to the end members completely to embed the tension-compression bearing member to maintain substantially undistorted the serpentine configuration of the tension-compression bearing member when subject to the hydrostatic forces in the well bore.

In a more specific aspect of the invention there is provided a liquid-tight seal in each of the end members adjacent the end of the conductor carrying channel to form with the chanel a liquid-tight enclosure which extends continuously from one end member through the channel to the other end member. Liquid-tight electrical conducting means extend through the seal to provide for electrical transmission therethrough. A non-conducting liquid fills the liquid-tight enclosure to withstand the compressive forces transmitted through the resilient sheath to the channel extending between the transducers.

For a more complete understanding of the present invention, reference may now be had to the following description taken in conjunction with the accompanying drawings in which:

Fig. 1 illustrates an acoustic logging tool;

Fig. 2 is a view partially in section of the coupling member;

Fig. 3 is a sectional view taken along line 3—3 of Fig. 2;

Fig. 4 is a section taken along line 4—4 of Fig. 2;

Fig. 5 is a view partially in section of another modification of the invention;

Fig. 6 is a sectional view taken along the line 6—6 of Fig. 5; and

Fig. 7 is a sectional view taken along the line 7—7 of Fig. 5.

Referring now to Fig. 1, an acoustic well logging tool is illustrated as comprising an acoustic insulating section 10 mechanically interconnecting a lower transducer 10a, for example a transmitter, and an upper transducer 10b which may be a receiver. The section 10 maintains the transducers in a predetermined spaced apart relation for travel throughout the length of a well bore. An amplifying section 10c may be included in the exploring system whose output may be transmitted by way of a suspending cable 10d to surface instruments. Applicants' invention is the improved coupling member 10 for such systems, particularly useful where it is necessary to maintain an accurate spacing between the transducers while maintaining a predetermined acoustic transmission characteristic.

In Figs. 2–4 one end of the coupling member 10 has been shown in detail. In this modification of the invention, although direct transmission of acoustic energy is substantially eliminated the structure is resistant to damage by deformation under high pressures due to hydrostatic heads present in the bore holes.

More particularly, the coupling member includes at each end an adapter 11 which may threadedly engage either the acoustic transmitter 10a or the receiver 10b. As illustrated, the adapter 11 is threaded into the upper end of a cylindrical housing for transmitter 10a, only part of which is shown in Fig. 1. The acoustic transducer housed in the cylinder 10a may be of the type generically disclosed in the application of Pat McDonald, S. N. 181,284, filed August 24, 1950, for an Acoustic Well Logging System, now Patent No. 2,722,282, dated November 1, 1955. The adapter 11 is provided with shoulders for seating the ends of transducer 10a. The addition of suitable gaskets may also be provided to assure a water-tight seal to prevent ingress of water or other fluids into the transducer compartment. The end 12 of the adapter 11 is generally cone shaped with the exterior circumferentially grooved to provide a relatively large surface area. The adapter 11 is center bored and has, in the region of the end 12, a funnel-like interior to receive a body member 13 which has a cone shaped end conforming with and registered in the funnel-like interior of the adapter 11.

The body member 13 has cylindrical end portions. The end 14 of member 13 extending beyond the end of the adapter 11 is threaded exteriorly to receive a nut 15 which bears against the end of the adapter 11 securely to maintain the body member 13 seated in the cone shaped interior of adapter 11.

The body member 13 is also provided with a central opening through which a cable 16 extends. In the form shown, cable 16 includes a double layer of spirally wound armor, the two layers being wound in opposite directions. The outer layer of armor is disposed along the inner face of the cone shaped interior of the body member 13. An outer wedging member 17 having circumferential wedge shaped grooves on the exterior surface thereof engages each of the several members of the outer armor of cable 16. The outer cone or wedging member 17 also has a cone shaped interior into which extends the inner layer of armor of cable 16. The inner layer is forced outwardly and is maintained in place by an inner cone 18. A nut 19 threadedly engaging the interior of the body member 13 forces the inner cone 18 and the outer cone 17 forward into the body member 13 rigidly to secure the armor members within the body member to withstand tensional forces that may be exerted on the cable member 16. The grooved end 12 of the adapter 11 and the cable 16 extending from the adapter 11 are moulded in a rubber jacket 20 that is of the same diameter as the adapter 11 and the cylinder 10a to form an elongated unit of uniform diameter. The rubber jacket 20, a poor transmitter of acoustic energy, substantially eliminates transmission directly from one end of the coupling member to the other. At the same time the hydrostatic forces within the bore hole exert a force through the jacket 20 into the spirally wound armor members of the cable 16 to maintain them in substantially undistorted configuration when subject to compressional forces effectively axially of the coupling member 10. Due to the fact that the spirally wound members are disposed in a serpentine path through the coupling member 10 they will not transmit acoustic pulses. At the same time the spirally wound members provide a tensile strength in the coupling member to prevent loss or damage of the acoustic logging system in traversing tight sections of a bore hole.

It has been found that difficulty is often encountered under great hydrostatic heads such as may be found in depths of 10,000 feet or more in a bore hole, such hydrostatic heads producing deformation of the coupling member and damage to electrical conducting members extending through the cable 16. In order to eliminate the possibility of such damage, applicants provide a channel preferably extending throughout the length of the coupling member and forming a part of a liquid-tight enclosure which may then be filled with a non-conducting liquid medium to withstand such pressures as may be transmitted from the rubber jacket 20 to the cable 16. More particularly, in a preferred embodiment of the invention the cable 16, which may be a length of a conventional well logging cable, is securely fitted into the adapter 11 as by the above described wedging means and then is drilled or milled completely to remove the conductors therein. Since such conductors ordinarily are solidly embedded in a protective rubber coating, such coating may be removed along with the conductors to leave a free channel through the length of the coupling member 10. Thereupon conductors such as conductors 21 may be threaded through the length of the coupling member and may readily be replaced or additional conductors may be provided merely by threading them through the channel. Adjacent the end of the body member 13 there is provided a bulkhead 25 in which there is incorporated a suitable liquid seal such as an O-ring disposed in a groove in the periphery of the bulkhead member 25. A nut 27 threadedly engages the interior of the adapter 11 maintaining the bulkhead in place against the body member 13. A suitable orifice or fitting, not shown, may then be provided to fill the interior of the bulkhead 25 with a non-conductive liquid, such as castor oil, completely to fill the channel extending through the coupling member and a similar volume adjacent a bulkhead in the upper end of the coupling member 10. A pair of glass sealed terminals 30, secured to the inner face of the bulkhead 25, provide an electrical conducting path through the bulkhead. Conductors 21 are connected to one end of the terminals 30. At the other ends are connected conductors 32 which extend to a multi-terminal plug and socket combination 34. By this means the transducer cylinder 10a may be readily disconnected from the coupling member. At the same time the oil filled enclosure in the coupling member is maintained liquid-tight.

Thus when the coupling member 10 is subject to hydrostatic pressures which otherwise would tend to change its length, the spirally wound cable stress members effectively prevent such change, the compressional forces are transmitted from the cable stress members to the wedging means 17 and 18 and thence to the body member 13 and then to the bulkhead 25. Forces existing at the end 14 of the body member 13 and tending to collapse the cable 16 to the detriment of the conductors therein are effectively opposed by the liquid in the enclosure.

While it will be preferred to provide a continuous liquid-tight enclosure extending from one end of the coupling member 10 to the other interiorly of the cable 16 for the purpose of providing ease of exchange or addition of the conductors extending through the coupling member, it will be apparent that the liquid medium need not extend through the length of the coupling member. More particularly, separate liquid filled enclosures may be provided at each end of the coupling member, extending to the point on cable 16 at which the strain members are flared for insertion into the coned socket members. In either case it will be preferred that there be no air spaces into which the conductors of the cable may be extruded by the extremely high exterior pressures exerted on the rubber jacket 20.

It will be understood that elements identical with those illustrated in detail in the lower portion of Fig. 1 are also provided in the upper portion thereof. In each case the adapter members threadedly engage the housing of the acoustic transducers to maintain them a fixed distance apart.

The direct transmission of sound through the coupling member is so low compared with energy transmitted by way of formations that it does not, in the transmission case, mask the formation transmitted energy nor, in the velocity case, produce a velocity indication prior to the arrival of acoustic energy by way of the formations.

Referring now to Figs. 5–7, there is illustrated a modified form of the invention particularly useful in velocity well logging systems. In such velocity well logging systems as generically disclosed in the application to Gerald C. Summers, S. N. 192,750, filed October 28, 1950, for Velocity Well Logging, now U. S. Patent 2,704,364, dated March 15, 1955, the time interval between transmission of a pulse from a transmitter and the arrival of that pulse, after having traversed the formations, at a receiver is utilized to plot variations in the formation velocity. In formations having a velocity lower than the velocity of sound in water, the first pulse to arrive at the receiver necessarily travels by way of the water path and therefore definition of such low velocity formations is extremely difficult. For all higher velocity formations the tool is exceedingly useful. However, it is required that the transmitter and receiver be maintained at a fixed spacing and that if the means for maintaining such spacing transmits sound that such transmission be at a velocity less than the velocity of sound in the formation and preferably less than the velocity of sound in water.

In the modification illustrated in Figs. 5–7, the coupling 10 includes a lower adapter 50 and an upper end member 51, only part of which is shown. A moulded rubber jacket 52 having an outside diameter equal to that of the adapters 50 and 51 encloses a system of rigid spacers which maintains the spacing between the transducers at a fixed value.

The rubber jacket has been shown cut away in part more clearly to illustrate the rigid spacing system which includes a tube 54 rigidly coupled to the lower adapter 50 and extending therefrom to a platform 55 adjacent the end member 51. The tube 54 preferably is rigidly connected to the platform 55 as by nuts 56 and 57.

Additionally, two elongated rod-like members, only one of which, the member 59, is shown in Fig. 5, extend from the platform 55 to a second platform 60 near the lower adapter 50. Rod 59 is fastened to platform 55 as by nuts 61 and 62, and to platform 60 as by nuts 63 and 64. The platform 60 may be in the form of a washer having a central aperture 65, Fig. 7, through which the tube 54 freely passes. Rod 59 and its companion rod 59a are both seen in Figs. 6 and 7 and are oriented on the platforms 55 and 60 at diametrically opposed positions.

Two additional rods 66 and 67 extend from the lower platform 60 to a washer 68 rigidly secured to the lower end of adapter 51. The members 66 and 67 are rigidly fastened at one end to the platform 60 and at the other end to the washer 68. Thus any compressional or tensional forces must be transmitted from the transmitter adapter 50 to the receiver adapter 51 by way of tube 54, platform 55, rods 59 and 59a, platform 60 and rods 66 and 67. Thus the foregoing are tension-compression bearing elements folded in a serpentine configuration to provide an elongated acoustic transmission path between the transmitter and receiver. Effectively the path is folded back on itself and is of such length and made of such material that the time required for an acoustic pulse to be transmitted by way of the compression-tension bearing member preferably is greater than the time required for transmission of an acoustic pulse through a water path equal in length to the space between transmitter adapter 50 and receiver adapter 51. By this means any pulses traveling by way of the formations from a transmitter to a receiver spaced apart by the coupling member 10 of Figs. 5–7 will actuate the receiver prior to the arrival of pulses transmitted either through the water path or through the tension-compression bearing member of the coupling unit.

The member 54 preferably is a hollow tube through which extends a rubber jacket 70 forming a channel between the adapters 50 and 51 and through which there extends the required interconnecting electrical conductors. As described in connection with Figs. 2–4, the jacket 70 and the enclosures interior of the adapters 50 and 51 preferably are filled with a non-conducting liquid to withstand the pressures exerted on the rubber jacket moulded around the elements of the coupling member 52. The jacket 70 is clamped in the interior of the lower adapter 50 by means of the insert 50a having a cone shaped end which forces the walls of the jacket 70 against the interior surface of the adapter 50. A liquid-tight bulkhead 50b bears against the member 50a, both of which are maintained in position by the nut 50c threadedly engaging the interior of the adapter 50. A similar enclosure is provided on the interior of the adapter 51 so that there is a continuous passage from adapter 50 through the jacket 70 to the adapter 51 to accommodate interconnecting conductors. When filled with oil or other non-conductive liquid, this passage successfully resists deformation due to high compressional forces exerted through the rubber jacket 52.

By the foregoing construction there is provided a coupling unit having an interior which is hollow for passage therethrough of necessary interconnecting conductors and additionally which is water-tight to prevent ingress of bore hole fluids when submerged. The structure of Figs. 5–7 is particularly useful for velocity logging systems. The dimensions of the mechanical coupling members are chosen so that the ratio of the total length of the coupling members to the velocity of sound through the material of which they are made is not greater than the ratio of the spacing between the transmitter and receiver and the velocity of sound in water. By this means it is assured that a pulse from a transmitter, traveling by way of formations, will reach the receiver ahead of the same pulse traveling through the coupling members. For example, the velocity of sound in water is in the order of 5,000 feet per second. Velocity of sound in steels such as may be utilized in the structures of Figs. 5–7 is in the order of 15,000 feet per second. In order to meet the requirements set forth above, it would be necessary to make the combined length of the coupling members three times the spacing between the associated transmitter and receiver in order to make the transmission time of the direct pulse greater than the formation traveling pulse.

The system illustrated in Figs. 5–7 is to be taken as illustrative only and not by way of limitation since it will be apparent that other modifications may be made. The unit may incorporate, for example, as many stages of folding as desirable in configurations differing from the one specifically discussed.

While the foregoing embodiments of the invention have been described in detail, it will be understood that other modifications will now suggest themselves to those skilled in the art and it is intended to cover such modifications as fall within the scope of the appended claims.

What is claimed is:

1. In an acoustic well logging system including a pair of cylindrical acoustic transducer housings at each end of said system, the improvement which comprises tension-compression bearing means of cross-sectional area less than said housings extending between said housings to maintain them in a predetermined spaced apart relation and forming an extended acoustic transmission path, a conductor accommodating channel extending between said housings through said tension-compression bearing means, and a substantially solid resilient means of diameter equal to the diameter of said housings disposed in liquid-tight relation around said tension-compression bearing member.

2. In an acoustic well logging system including a pair of cylindrical acoustic transducer housings, the improvement which comprises tension bearing means of cross-sectional area less than said housings extending between said housings to limit the spacing therebetween to a predetermined maximum, said tension bearing means forming a spiral path between said housings, a conductor accommodating channel extending between said housings through said tension bearing means and a substantially solid resilient sheath of diameter equal to the diameter of said housings disposed around said tension-bearing means in water-tight relation to maintain said spiral path when subject to compressional forces.

3. In an acoustic well logging system including a pair of cylindrical transducer housings, the improvement which comprises a tension-compression bearing structure including metallic means folded back on itself and extending between said housings to maintain them in a predetermined spaced apart relation and characterized by an acoustic transmission path long compared to the spacing therebetween, a conductor-accommodating channel extending between said housings through said tension-bearing structure, and a substantially solid resilient means of diameter equal to the diameter of said housing disposed in liquid-tight relation around said tension-compression bearing structure between said housings.

4. In an acoustic well logging system including a pair of cylindrical acoustic transducer housings, the improvement which comprises a tension bearing coupling rigidly secured at each end to said housings to limit the spacing therebetween to a predetermined maximum and characterized by spirally disposed members forming a nonlinear acoustic transmission path, a conductor-accommodating channel extending between said housings through said coupling, and a substantially solid resilient means of diameter equal to the diameter of said housings moulded in liquid-tight relation to said housing and around said coupling to maintain the configuration of said non-linear transmission path upon application thereto of compressional forces to maintain said housings a predetermined minimum distance apart.

5. In an acoustic well logging system including a pair of cylindrical acoustic transducer housings, the improvement which comprises a tube rigidly secured to a first of said housings and extending co-axially therefrom to a point adjacent the other of said housings, a plurality of rods coupled to the end of said tube and extending toward and terminating adjacent said first housing, additional rods coupled to the ends of said first named rods and extending and rigidly secured to the second of said housings to form with said plurality of rods and with said tube an acoustic path which is substantially longer than the distance between said housings, a conductor accommodating channel extending through said tube and into said second housing, and resilient means of diameter equal to the diameter of said housing moulded in liquid tight relation to said housing around said tube and rods.

6. A coupling member for maintaining a pair of transducers adapted for measurement of acoustic properties of media adjacent thereto in a predetermined spaced apart relation which comprises a pair of end members each adapted rigidly to be coupled to said transducers, a tension-compression bearing member secured at each end to said end members and disposed in a serpentine path between said end members, means forming an enclosed channel positioned coaxially of said tension-compression bearing member and extending into said end members for passage therethrough of electrical conducting means between said transducers, a liquid-tight seal in each of said end members adjacent the ends of said channel forming means to form a liquid-tight enclosure extending from one end member through said channel to the other end member, electrical conducting terminals extending through said liquid-tight seal, a non-conducting liquid filling said enclosure, and a substantially solid resilient sheath embedding said tension-compression bearing member for maintaining substantially undistorted the configuration of said last named member in said serpentine path when subject to tensional or compressional forces.

7. In an acoustic well logging system including an acoustic transmitter and an acoustic receiver of cylindrical form and adapted to be raised and lowered in a bore hole, a coupling member for maintaining said transmitter and receiver in a predetermined spaced apart relation for measurement of acoustic properties of media adjacent thereto which comprises a pair of end members each adapted rigidly to be coupled to said transmitter and said receiver, a tension-compression bearing member secured at one end to said end members and disposed in a serpentine path between said end members, means forming an enclosed channel extending through said tension-compression bearing member and extending into said end members for passage therethrough of electrical conducting means between said transmitter and said receiver, means within each of said end members for forming with said channel forming means a liquid-tight enclosure extending from one end member through said channel to the other end member, and a substantially solid resilient sheath having a diameter equal to the diameter of said cylindrical transmitter and receiver embedding said tension-compression bearing member and moulded to said end members for maintaining substantially undistorted the configuration of said tension-compression bearing member in said serpentine path when subject to hydrostatic forces in said well bore.

8. In a system for acoustically logging a bore hole filled with a liquid which includes a pair of cylindrical transducer housings, the improvement which comprises tension-compression bearing means extending between said housings to maintain them in a predetermined spaced apart relation, said tension-compression bearing means including metallic means folded back on itself to form an acoustic transmission path having a ratio of length to velocity not greater than the ratio of the spacing between said housings to velocity of an acoustic pulse through said liquid, a conductor accommodating channel extending between said housings through said tension-compression bearing means, and a substantially solid resilient means of diameter equal to the diameter of said housings disposed in liquid-tight relation around said tension-compression bearing means.

9. A system for measuring the velocity of sound in formations adjacent a liquid filled well bore which comprises a pair of cylindrical transducers, a substantially rigid structure of cross sectional area less than said transducers mechanically coupling said transducers to maintain them a predetermined distance apart characterized by a rigid member folded along its length, said member having a ratio of length to velocity of sound therethrough less than the ratio of the distance between said transducers to the velocity of sound in said liquid whereby a pulse traveling from one of said transducers to the other by way of said liquid or said formations will arrive at said other transducer prior to the pulse traveling by way of said rigid member, and resilient means moulded around said rigid member of diameter substantially equal the diameter of said transducers to minimize the volume of said liquid between said transducers.

10. A system for measuring the velocity of sound in formations adjacent a liquid filled well bore which comprises a pair of transducers, a substatnially rigid structure mechanically coupling said transducers to maintain them a predetermined distance apart and including a first member extending from a first of said transducers to a platform adjacent the second of said transducers, at least one member extending from said platform to a second platform adjacent the first of said transducers, and at least one rigid member extending from said second platform to the second of said transducers to form a serpentine path having a ratio of length to velocity of sound therealong less than the ratio of said predetermined distance to the velocity in liquid whereby the first arrival of a pulse from one of said transducers to the other will be by way of said liquid or higher velocity formations.

11. In an acoustic well logging system including a pair of cylindrical acoustic transducer housings, the improvement which comprises a tension bearing coupling rigidly secured at each end to said housings to limit the spacing therebetween to a predetermined maximum and characterized by spirally disposed members forming a non-linear acoustic transmission path, conductor means extending between said housings, and a substantially solid resilient means of diameter equal to the diameter of said housings moulded in liquid-tight relation to said housings and around said coupling to maintain the configuration of said non-linear transmission path upon application thereto of compressional forces to maintain said housings a predetermined minimum distance apart.

References Cited in the file of this patent

UNITED STATES PATENTS

| 2,440,903 | Massa | May 4, 1948 |
| 2,590,531 | McLoad | Mar. 25, 1952 |
| 2,592,780 | Woods | Apr. 15, 1952 |